US012163586B2

(12) United States Patent
Barrientos Blanco

(10) Patent No.: US 12,163,586 B2
(45) Date of Patent: Dec. 10, 2024

(54) TRANSMISSION

(71) Applicants: Ningbo Geely Automobile Research & Development Co., Ltd., Ningbo (CN); Zhejiang Geely Holding Group Co., Ltd., Zhejiang (CN)

(72) Inventor: Eva Barrientos Blanco, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/138,056

(22) Filed: Apr. 22, 2023

(65) Prior Publication Data

US 2023/0265921 A1 Aug. 24, 2023

Related U.S. Application Data

(63) Continuation of application No. PCT/CN2021/133063, filed on Nov. 25, 2021.

(30) Foreign Application Priority Data

Dec. 4, 2020 (EP) .................................... 20212033

(51) Int. Cl.
*F16H 63/32* (2006.01)
(52) U.S. Cl.
CPC ....... *F16H 63/32* (2013.01); *F16H 2063/324* (2013.01)
(58) Field of Classification Search
CPC ...... F16H 63/32; F16H 2063/324; F16H 3/08; F16H 63/3416; F16H 63/3425;
(Continued)

(56) References Cited

U.S. PATENT DOCUMENTS 4,431,073 A 2/1984 Nagao
6,824,491 B2 * 11/2004 Chen .................... F16H 3/54
475/299

(Continued)

FOREIGN PATENT DOCUMENTS

CN 201093036 Y 7/2008
CN 101377229 A 3/2009
(Continued)

OTHER PUBLICATIONS

International Search Report from corresponding International Application No. PCT/CN2021/133063, mailed on Feb. 10, 2022, 3 pages.

*Primary Examiner* — Victor L MacArthur
(74) *Attorney, Agent, or Firm* — Tucker Ellis LLP

(57) ABSTRACT

A transmission includes a shifting fork. The transmission has a first gear state and a second gear state being selectable by means of the shifting fork. The shifting fork is displaceable in an axial direction between a first predetermined position and a second predetermined position. The first gear state is provided when the shifting fork is placed in the first predetermined position and the second gear state is provided when the shifting fork is placed in the second predetermined position. The first predetermined position and the second predetermined position are arranged one after the other without any further predetermined position providing a further selectable gear state arranged between the first predetermined position and the second predetermined position. The first gear state provides a first gear of the transmission and the second gear state provides a second gear or a park lock state of the transmission.

14 Claims, 6 Drawing Sheets

(58) Field of Classification Search
CPC ............. F16H 2200/0021; F16H 63/30; F16H 2063/3093; F16H 2200/0034; B60Y 2200/91
See application file for complete search history.

(56) References Cited

U.S. PATENT DOCUMENTS

| | | | |
|---|---|---|---|
| 8,764,595 B1 * | 7/2014 | Sugimoto | ............. F16H 37/046 475/5 |
| 2004/0192489 A1 | 9/2004 | Chen | |
| 2020/0070653 A1 | 3/2020 | Janson | |

FOREIGN PATENT DOCUMENTS

| | | |
|---|---|---|
| CN | 101463901 A | 6/2009 |
| CN | 101637901 A | 2/2010 |
| CN | 102562959 A | 7/2012 |
| CN | 103998828 A | 8/2014 |
| CN | 106838304 A | 6/2017 |
| DE | 10224357 A1 | 12/2003 |
| DE | 102013108300 A1 | 2/2015 |
| DE | 102013108736 A1 | 2/2015 |
| EP | 1167803 A1 | 1/2002 |
| JP | 6380272 B2 | 8/2018 |
| WO | 2020025077 A1 | 2/2020 |

* cited by examiner

TRANSMISSION

RELATED APPLICATION DATA

This application is a continuation of International Patent Application No. PCT/CN2021/133063, filed Nov. 25, 2021, which claims the benefit of European Patent Application No. 20212033.3, filed Dec. 4, 2020, the disclosures of which are incorporated herein by reference in their entireties.

TECHNICAL FIELD

The invention relates to a transmission which comprises a shifting fork, where the transmission has a first gear state and a second gear state being selectable by means of the shifting fork, and the shifting fork is displaceable in an axial direction between a first predetermined position and a second predetermined position, where the first gear state is provided when the shifting fork is placed in the first predetermined position and the second gear state is provided when the shifting fork is placed in the second predetermined position.

BACKGROUND

In today's transmissions for vehicles with electrical motors, some elements used in manual transmissions are not needed, and other has to be adapted to fit the new technologies. An important issue is the space limitation and how to reduce the size of the actuators of the transmission. One actuator system is usually used for shifting two different elements, trying to reduce the size and complexity of the actuator system. The shifting is performed from a neutral position where a sleeve is arranged centred relative to a hub. By movement of the sleeve from the centred neutral position to the left, one dog clutch is engaged and by movement of the sleeve from the centred neutral position to the right, another dog clutch is engaged. In this way, different gear states of the transmission can be achieved.

SUMMARY

An objective of the invention is to provide a transmission enabling the size and complexity of the transmission to be reduced.

The objective is achieved by a transmission that comprises a shifting fork, where the transmission has a first gear state and a second gear state being selectable by means of the shifting fork, the shifting fork is displaceable in an axial direction between a first predetermined position and a second predetermined position, and the first gear state is provided when the shifting fork is placed in the first predetermined position and the second gear state is provided when the shifting fork is placed in the second predetermined position, where the first predetermined position and the second predetermined position are arranged one after the other without any further predetermined position providing a further selectable gear state arranged between the first predetermined position and the second predetermined position, and where the first gear state provides a first gear of the transmission and the second gear state provides a second gear or a park lock state of the transmission.

The invention is based on the insight that by such a transmission, the shifting of two different elements, for example engagement of dog clutches, can be performed by movement of the shifting fork in one direction only. This enables a more compact design and also reduced shifting times. Instead of using a conventional solution where the sleeve has to be moved from a centred neutral position to the left for engagement of one element, and then back to the centred neutral position and further to the right for engagement of the other element, it is possible to achieve a transmission with a non-centred neutral position or without a neutral position.

The first predetermined position and the second predetermined position are arranged after each other without any gear state selectable by the shifting fork therebetween. This will however not exclude that any intermediate "gear state" could take place temporarily during the transition between the first predetermined position and the second predetermined position, though such a "gear state" is not selectable and have no substantial impact on the torque provided by the transmission.

The "first gear" and the "second gear" have different gear ratios providing different gears for the transmission. By the expression "park lock state" is meant that a shaft of the transmission is locked against rotation and thereby no torque can be transmitted by the transmission.

The transmission can comprise a first shaft, a rotating member arranged on the first shaft, where the rotating member is rotationally journaled relative to the first shaft, and a hub arranged on the first shaft, where the hub is rotationally locked to the first shaft, and a sleeve moveable by means of the shifting fork in the axial direction, where the sleeve and the hub are engageable and rotationally locked to each other when engaged, and the sleeve and the rotating member are engageable and rotationally locked to each other when engaged, and preferably, in the first predetermined position of the shifting fork, the sleeve and the rotating member are engaged and the sleeve and the hub are engaged. Hereby, the first gear state can be achieved in an efficient way. The rotating member can be a gear wheel for instance.

According to one embodiment, the shifting fork is placeable in a further predetermined position providing a further gear state being a neutral of the transmission, where the shifting fork is displaceable from the further predetermined position to the first predetermined position and further in the same direction from the first predetermined position to the second predetermined position. Hereby, a non-centred neutral position can be achieved, in addition to the first and second gear states.

For achieving such a non-centred neutral position, optionally, the rotating member, such as a gear wheel idling in the non-centred neutral position, can be used, and further in the further predetermined position of the shifting fork, the sleeve and the rotating member are engaged and the sleeve and the hub are disengaged.

For engagement of the sleeve and the rotating member, the sleeve can have splines arranged on an external surface of the sleeve for engagement with splines of the rotating member arranged on an internal surface of the rotating member. Further, for engagement of the sleeve and the hub, the sleeve can have splines arranged on an internal surface of the sleeve for engagement with splines of the hub arranged on an external surface of the hub. Optionally, by an undercut of the rotating member for receiving the sleeve, the design can be even less space consuming.

According to a further embodiment, the transmission comprises a further component which is activated by the shifting fork in the second predetermined position of the shifting fork. Hereby, the second gear state can be achieved in a rational way where the further component can be arranged on the first shaft of the transmission or on a second shaft of the transmission.

For example, the further component can be a park lock mechanism locking a shaft of the transmission against rotation when activated by the shifting fork, or the further component can be a further rotating member arranged on a shaft, such as a gear wheel, where the further rotating member is rotationally journaled relative to the shaft, and the further rotating member is rotationally locked to the shaft when activated by the shifting fork. This shaft to be locked by the parking lock mechanism or onto which the further rotating member is arranged, can be the first shaft or a second shaft of the transmission.

According to a further embodiment, the first predetermined position of the shifting fork is a first end position where the shifting fork is not movable further away from the second predetermined position, and the second predetermined position of the shifting fork is a second end position where the shifting fork is not movable further away from the first predetermined position. Hereby, a compact transmission with a first gear state and a second gear state can be achieved.

According to a further embodiment, the further predetermined position of the shifting fork is a first end position where the shifting fork is not movable further away from the second predetermined position, and the second predetermined position of the shifting fork is a second end position where the shifting fork is not movable further away from the further predetermined position. Hereby, a compact transmission with a first gear state, a second gear state and a non-centred neutral position can be achieved.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1A:
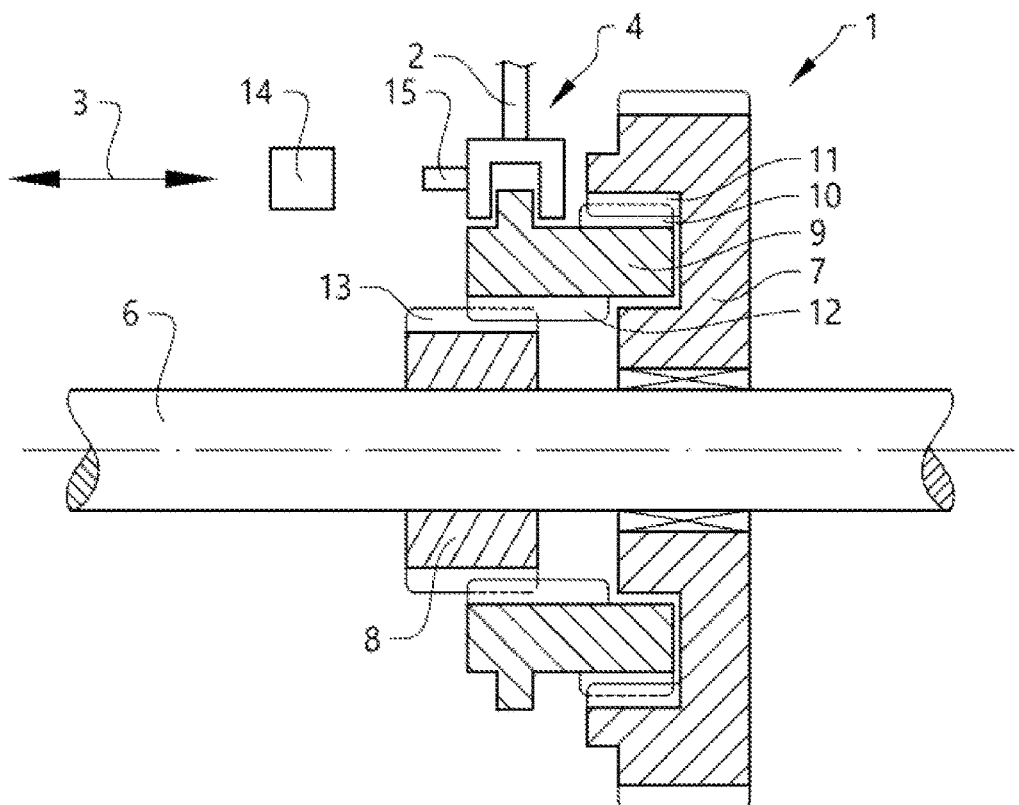
FIG. 1A is a view of the vehicle transmission shown for the first gear state providing the first gear, where the shifting fork is positioned in the first predetermined position.
Figure 1B:
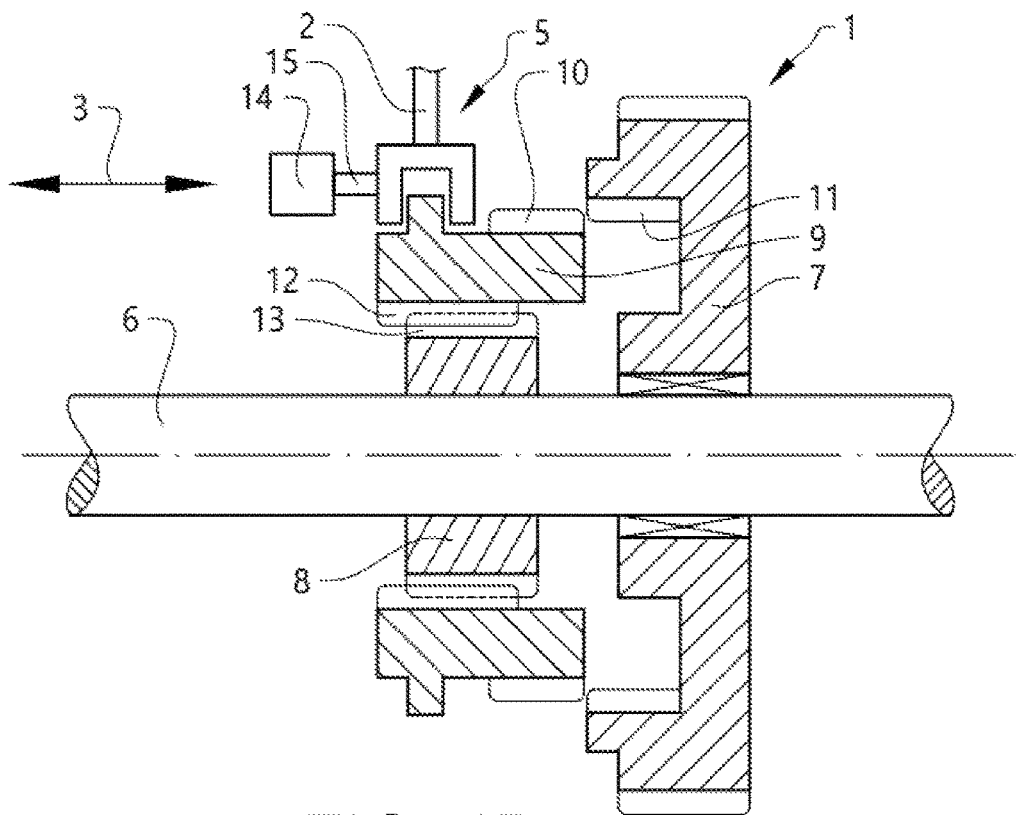
FIG. 1B is a view of the vehicle transmission in FIG. 1A, shown for the second gear state providing the second gear or the park lock, where the shifting fork is positioned in the second predetermined position.

FIGS. 1A and 1B are schematic illustrations of a vehicle transmission 1. The transmission 1 comprises a shifting fork 2. The transmission has a first gear state and a second gear state which are selectable by means of the shifting fork 2. The shifting fork 2 is displaceable in an axial direction 3 between a first predetermined position 4 (illustrated in FIG. 1A) providing the first gear state and a second predetermined position 5 (illustrated in FIG. 1B) providing the second gear state.

In other words, the first gear state is provided when the shifting fork 2 is placed in the first predetermined position 4 and the second gear state is provided when the shifting fork 2 is placed in the second predetermined position 5. Further, the first predetermined position 4 and the second predetermined position 5 are arranged one after the other without any further predetermined position providing a further selectable gear state arranged between the first predetermined position and the second predetermined position. The first gear state provides a first gear of the transmission and the second gear state provides a second gear or a park lock state of the transmission, i.e. none of the first gear state and the second gear state being a neutral position of the transmission.

The transmission 1 comprises a first shaft 6, a rotating member 7 arranged on the first shaft 6, where the rotating member 7 is rotationally journaled relative to the first shaft 6. The rotating member 7 is suitably a gear wheel. The gear wheel 7 is a so called idling gear wheel which is journaled relative to the first shaft 6 but can be rotationally locked to the first shaft 6 through other components for transmitting torque between the gear wheel 7 and the first shaft 6.

In the example embodiment illustrated in FIGS. 1A and 1B, the transmission 1 further comprises a hub 8 arranged on the first shaft 6, where the hub 8 is rotationally locked to the first shaft 6, and a sleeve 9 moveable by means of the shifting fork 2. The sleeve 9 and the hub 8 are engageable with each other and are rotationally locked to each other when engaged. The sleeve 9 and the rotating member 7 are engageable with each other and are rotationally locked to each other when engaged. The sleeve 9 can have splines 10 arranged on an external surface of the sleeve for engagement with splines 11 of the rotating member 7 arranged on an internal surface of the rotating member. Further, the sleeve 9 can have splines 12 arranged on an internal surface of the sleeve for engagement with splines 13 of the hub 8 arranged on an external surface of the hub. In other words, the sleeve 9 is moveable in the axial direction 3 by means of the shifting fork 2 for engagement and disengagement relative to the rotating member 7 and the hub 8.

Optionally, the sleeve can have splines arranged on an internal surface for engagement with splines arranged on an external surface of the rotating member such as a dog ring of a gear wheel. See embodiment illustrated in FIGS. 4A and 4B.

In the first predetermined position 4 of the shifting fork 2, the sleeve 9 and the rotating member 7 are engaged and the sleeve 9 and the hub 8 are engaged, and thereby the gear wheel 7 is rotationally locked to the first shaft 6. For example, the gear wheel 7 can be engaged with another gear wheel of another shaft for transmitting torque between the shafts (not shown).

The transmission 1 suitably comprises a further component 14. The further component 14 is schematically illustrated in FIGS. 1A and 1B by a square box. In FIG. 1B, the vehicle transmission in FIG. 1A is shown for the second gear state where the shifting fork 2 is positioned in the second predetermined position 5.

Although in the illustrated example, the further component 14 is activated by the shifting fork 2 in the second shifting fork position 5, as schematically illustrated by an arm 15 of the shifting fork 2 reaching the further component 14, in another embodiment the further component 14 can be activated by the sleeve 9 if the further component 14 is arranged on the first shaft 6. The further component 14 can be arranged on the first shaft 6 of the transmission 1 or arranged on a second shaft of the transmission.

Optionally, the further component 14 can be directly activated by the shifting fork 2 or via a sleeve 9 or similar arranged on the first shaft 6 or another shaft. For example, the further component 14 can be a park lock mechanism locking a shaft of the transmission against rotation when activated by the shifting fork 2. This shaft can be the first shaft 6 of the transmission 1 or another shaft of the transmission. In another embodiment, the further component can be a further rotating member arranged on a shaft, such as a gear wheel, where the further rotating member is rotationally journaled relative to the shaft, and the further rotating member is rotationally locked to the shaft when activated by the shifting fork, for example via a sleeve. This shaft can be the first shaft 6 of the transmission 1 or another shaft of the transmission.

In the second predetermined position 5 illustrated in FIG. 1B, the sleeve 9 has just been disengaged from the gear wheel 7, and the sleeve 9 and the gear wheel 7 are disengaged. In case activation of the further component 14 is not performed instantaneously, the shifting fork 2 may have to be moved further away from the gear wheel 7 in the axial direction 3 to reach the second predetermined position 5. Depending on the design of the transmission, optionally the sleeve 9 and the hub 8 can be engaged or disengaged in the second predetermined position 5, whereas the sleeve 9 and the gear wheel 7 always are disengaged in this position.

For example, if a second sleeve is to be brought into engagement with the further component for achieving the second gear state, the second sleeve may have to be displaced a certain distance while being engaged with the further component before reaching the second predetermined position, and in such a case the sleeve has to be disengaged from the gear wheel immediately before the second sleeve starts to engage the further component and remain disengaged during the further movement of the shifting fork towards the second predetermined position.

Further, the first predetermined position 4 of the shifting fork 2 is suitably a first end position where the shifting fork 2 is not movable further away from the second predetermined position 5, and the second predetermined position 5 of the shifting fork 2 is suitably a second end position where the shifting fork 2 is not movable further away from the first predetermined position 4.

Figure 2A:
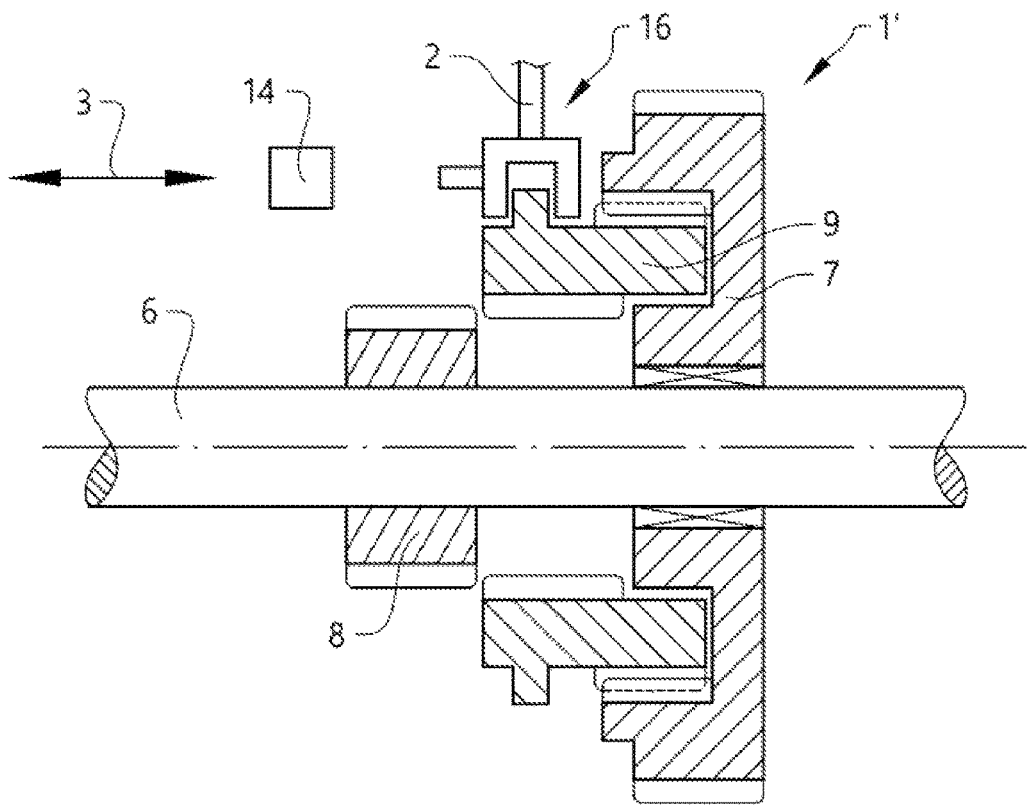
FIG. 2A is a view of a variant of the vehicle transmission shown for the further gear state being a non-centred neutral, where the shifting fork is positioned in the further predetermined position.
Figure 2B:
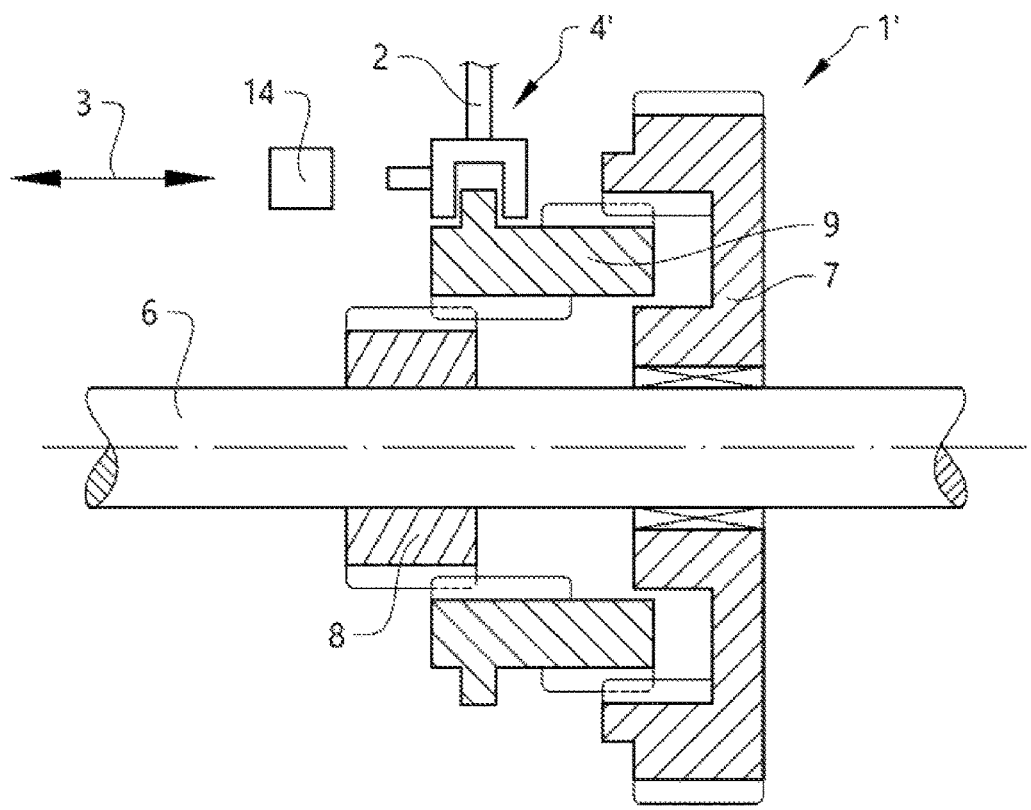
FIG. 2B is a view of the vehicle transmission in FIG. 2A, shown for the first gear state providing the first gear, where the shifting fork is positioned in the first predetermined position.
Figure 2C:
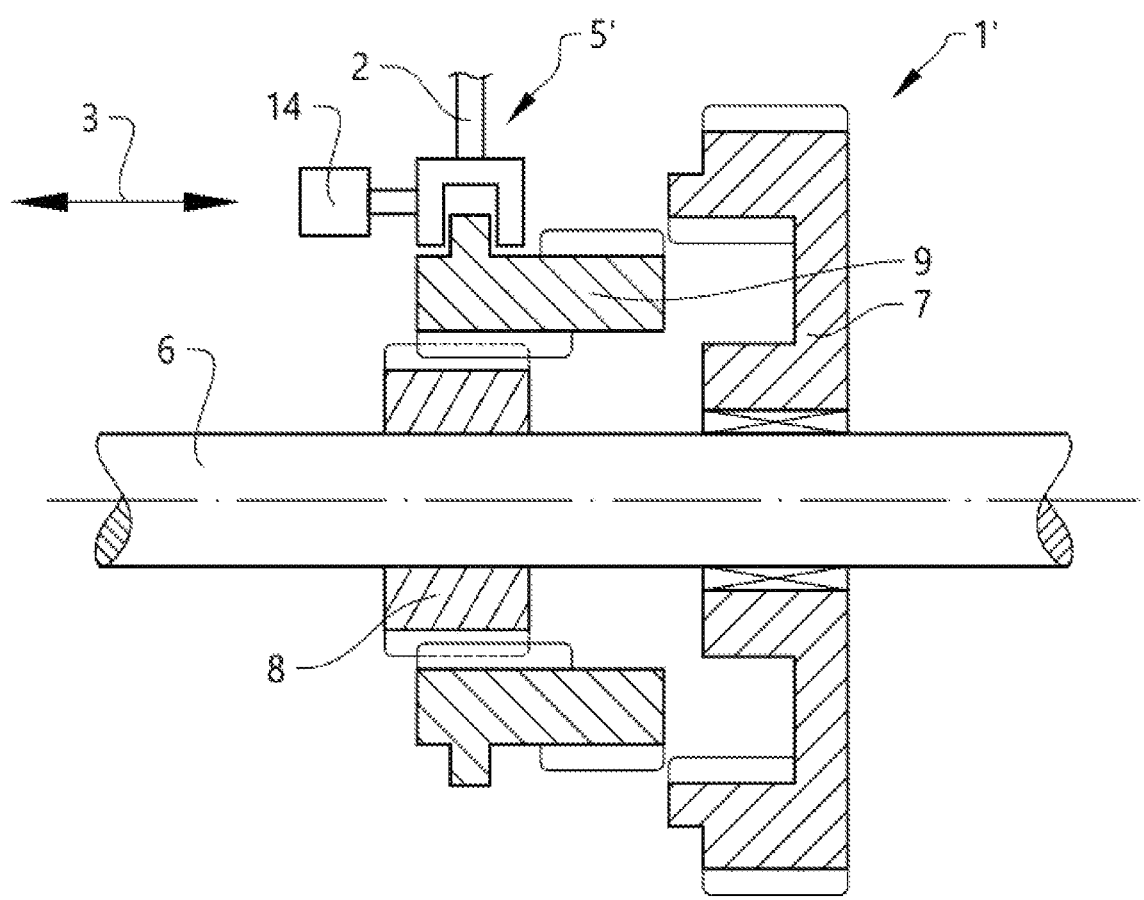
FIG. 2C is a view of the vehicle transmission in FIG. 2A, shown for the second gear state providing the second gear or the park lock, where the shifting fork is positioned in the second predetermined position.

FIGS. 2A, 2B and 2C show a variant of the vehicle transmission 1'. With reference to these figures, mainly different features of the transmission 1' relative to the transmission 1 in FIGS. 1A and 1B, will be described. For features not explicitly described, reference is made to the description of FIGS. 1A and 1B.

In FIG. 2A, the transmission 1' is shown with the shifting fork 2 positioned in a further predetermined position 16.

In the further predetermined position 16, the hub 8 and the sleeve 9 are disengaged, and the sleeve 9 and the rotating member 7 are engaged. As mentioned, the further predetermined position 16 may constitute a neutral of the transmission 1'. FIG. 2A is a view of the vehicle transmission 1' shown for the further gear state which is a non-centred neutral where the shifting fork 2 is positioned in the further predetermined position 16, i.e. to the right in FIG. 2A. In the further gear state, the journaled gear wheel 7 is idling, i.e. the gear wheel 7 is not rotationally locked to the first shaft 6. The shifting fork 2 is displaceable from the further predetermined position 16 to the first predetermined position 4' and further in the same direction from the first predetermined position 4' to the second predetermined position 5'.

FIG. 2B is a view of the vehicle transmission 1' in FIG. 2A, shown for the first gear state providing the first gear where the shifting fork 2 is positioned in the first predetermined position 4'. This position of the shifting fork 2 corresponds to the position illustrated for the transmission in FIG. 1A.

FIG. 2C is a view of the vehicle transmission 1' in FIG. 2A, shown for the second gear state providing the second gear or the park lock state, where the shifting fork 2 is positioned in the second predetermined position 5'. This position of the shifting fork 2 corresponds to the position illustrated for the transmission in FIG. 1B.

In addition, the further predetermined position 16 of the shifting fork 2 is a first end position where the shifting fork 2 is not movable further away from the second predetermined position 5', and the second predetermined position 5' of the shifting fork 2 is a second end position where the shifting fork 2 is not movable further away from the further predetermined position 16.

Figure 3A:
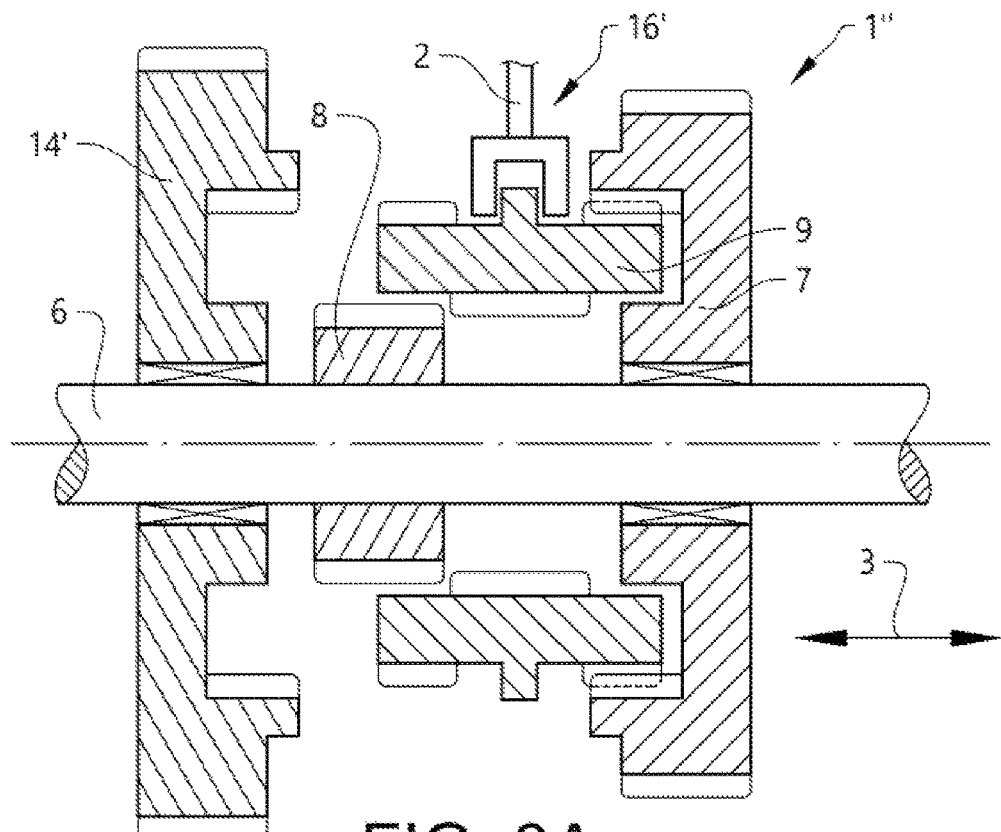
FIG. 3A is a view of a further variant of the vehicle transmission, shown for the further gear state being a non-centred neutral, where the shifting fork is positioned in the further predetermined position.
Figure 3B:
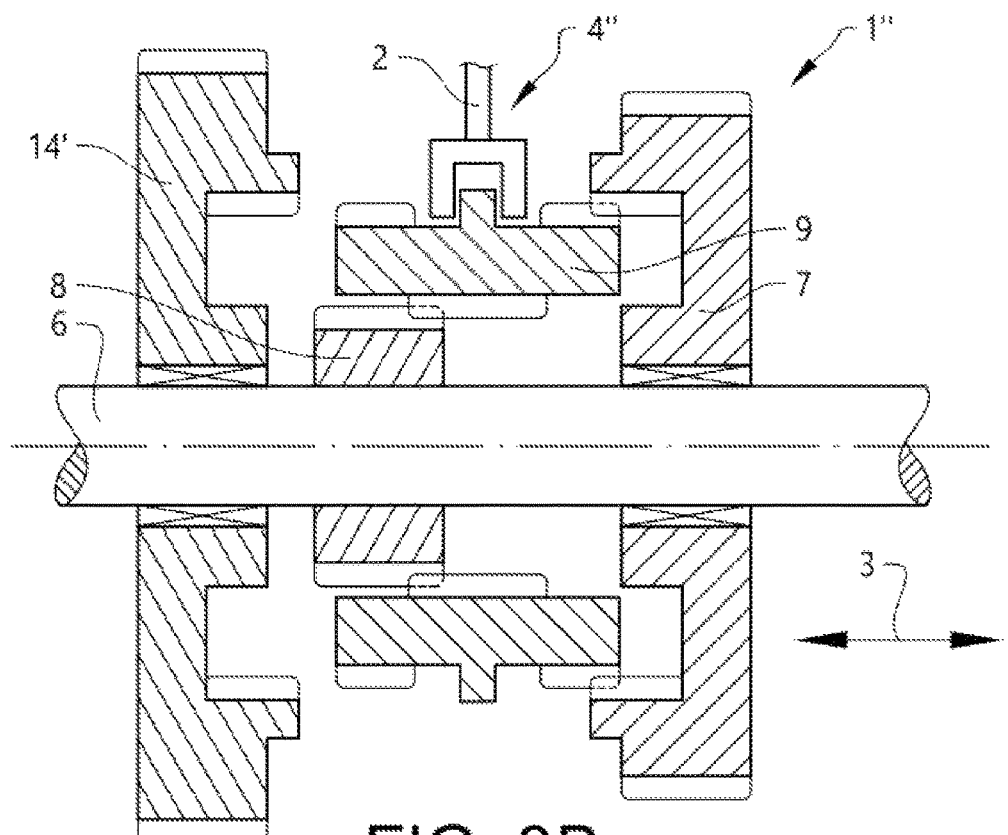
FIG. 3B is a view of the vehicle transmission in FIG. 3A, shown for the first gear state providing the first gear, where the shifting fork is positioned in the first predetermined position.
Figure 3C:
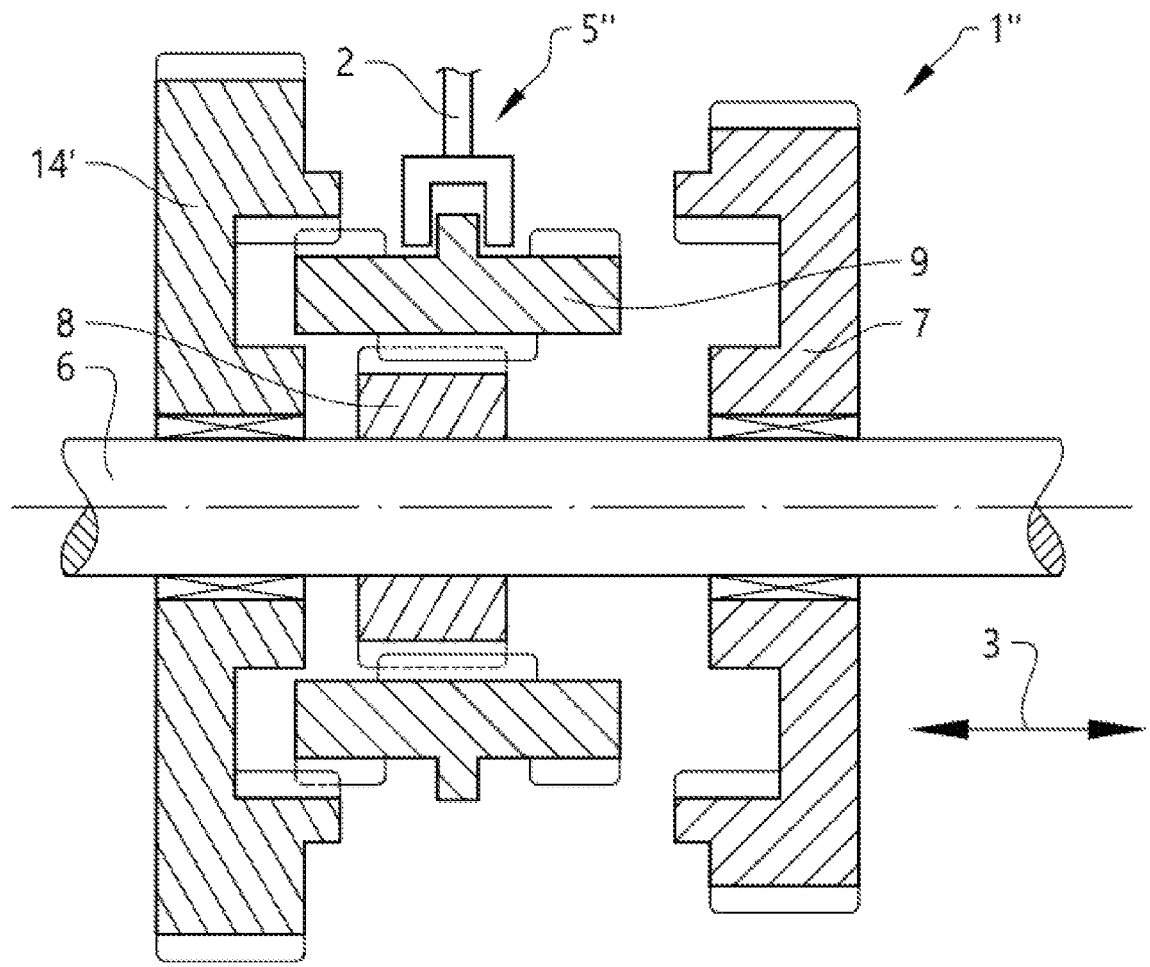
FIG. 3C is a view of the vehicle transmission in FIG. 3A, shown for the second gear state providing the second gear, where the shifting fork is positioned in the second predetermined position.

In FIGS. 3A, 3B, and 3C a further variant of the transmission is illustrated. The further component is a further gear wheel 14' arranged on the first shaft 6.

In the same way as described for FIG. 2A, FIG. 3A is a view of the vehicle transmission 1" shown for the further gear state being a non-centred neutral, where the shifting fork 2 is positioned in the further predetermined position 16', i.e. to the right in FIG. 3A. In the further gear state, the journaled gear wheel 7 is idling, i.e. the gear wheel 7 is not rotationally locked to the first shaft 6. The sleeve 9 and the gear wheel 7 are engaged, whereas the sleeve 9 and the hub 8 are disengaged.

FIG. 3B is a view of the vehicle transmission 1" in FIG. 3A, shown for the first gear state providing the first gear where the shifting fork 2 is positioned in the first predetermined position 4". In the predetermined first position 4" illustrated in FIG. 3B, the hub 8 and the sleeve 9 are engaged, and the sleeve 9 and the gear wheel 7 are engaged, such that the gear wheel 7 is rotationally locked to the first shaft 6 for providing the first gear. For example, the gear wheel 7 can be engaged with another gear wheel of another shaft for transmitting torque between the shafts (not shown).

FIG. 3C is a view of the vehicle transmission 1″ in FIG. 3A, shown for the second gear state providing a second gear where the shifting fork 2 is positioned in the second predetermined position 5″. In the second predetermined position 5″ illustrated in FIG. 3C, the sleeve 9 and the gear wheel 7 are disengaged, and the sleeve 9 and the further gear wheel 14′ are engaged and the sleeve 9 and the hub 8 are engaged, such that the further gear wheel 14′ is rotationally locked to the first shaft 6 for providing the second gear. For example, the gear wheel 14′ can be engaged with another gear wheel of another shaft for transmitting torque between the shafts (not shown).

Figure 4A:
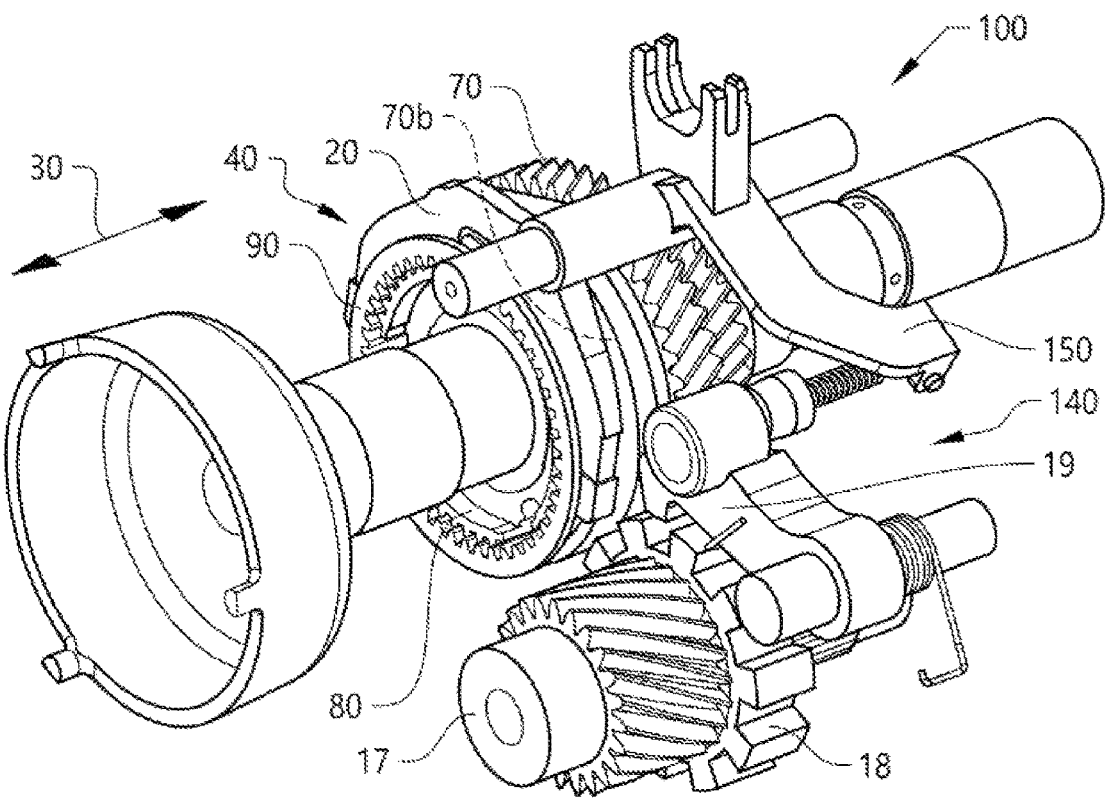
FIG. 4A is a view of a further variant the vehicle transmission, shown for the first gear state providing the first gear, where the shifting fork is positioned in the first predetermined position.

FIG. 4A is a view of a further variant of the vehicle transmission 100 shown for the first gear state providing the first gear, where the shifting fork 20 is positioned in the first predetermined position 40. The sleeve 90 is engaged with a dog ring 70b of the gear wheel 70, and the sleeve 90 and the hub 80 are engaged. The sleeve 90 has splines arranged on an internal surface for engagement with splines arranged on an external surface of the hub 80 and for engagement with splines arranged on an external surface of the dog ring 70b.

The further component is a park lock mechanism 140 arranged on the second shaft 17 for locking the second shaft 17 against rotation. The park lock mechanism 140 has a wheel 18 and a pawl 19 which can be engaged for locking the second shaft 17. In the first predetermined position 40 of the shifting fork 20, the park lock state is not activated, i.e. the wheel 18 and the pawl 19 are disengaged from each other.

Figure 4B:
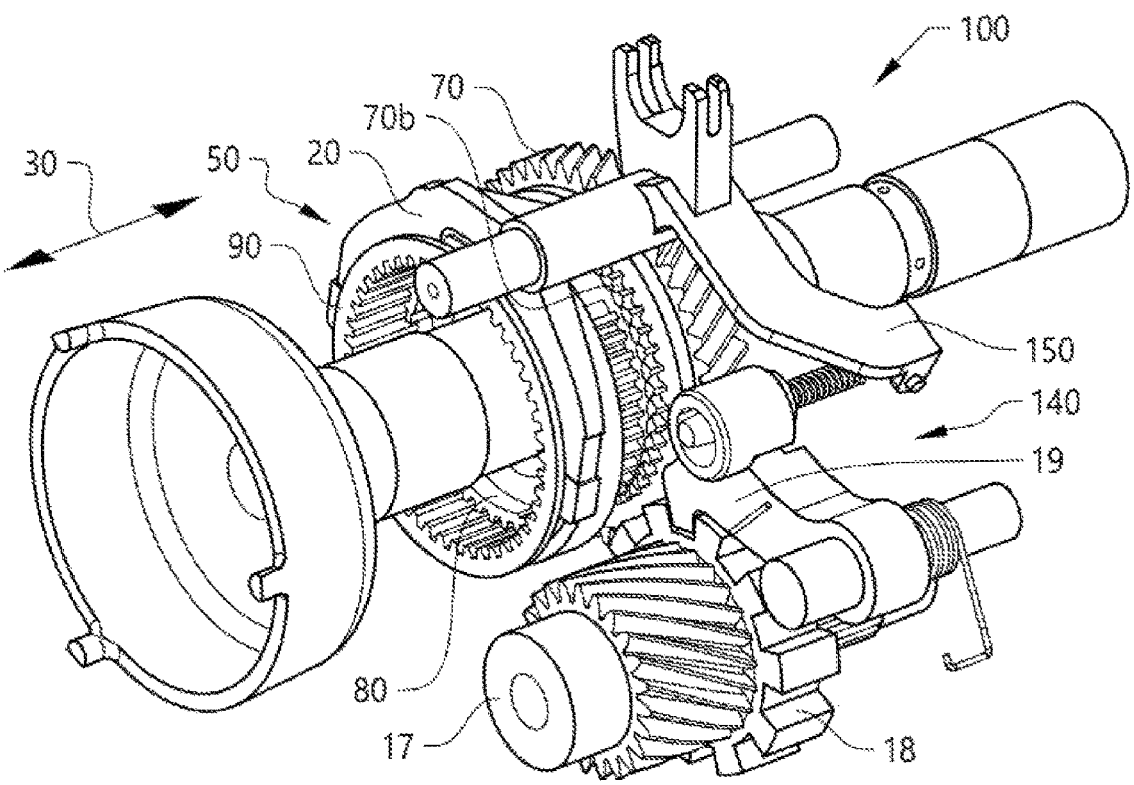
FIG. 4B is a view of the vehicle transmission in FIG. 4A, shown for the second gear state providing the park lock state, where the shifting fork is positioned in the second predetermined position.

FIG. 4B is a view of the vehicle transmission in FIG. 4A, shown for the second gear state providing the park lock state, where the shifting fork 20 is positioned in the second predetermined position 50. In comparison to FIG. 4A, in FIG. 4B the sleeve 90 has been displaced in the axial direction 30 by means of the shifting fork 20 which has been moved from the first predetermined position 40 to the second predetermined position 50. The sleeve 90 is disengaged from the dog ring 70b of the gear wheel 70. Instead an arm 150 of the shifting fork 20 has activated the park lock mechanism 140 such that the wheel 18 and the pawl 19 are engaged, thereby locking the second shaft 17.

It is to be understood that the present invention is not limited to the embodiments described above and illustrated in the drawings; rather, the skilled person will recognize that many changes and modifications may be made within the scope of the appended claims.

What is claimed is:

1. A transmission comprising a shifting fork, the transmission having a first gear state and a second gear state being selectable by means of the shifting fork, the shifting fork being displaceable in an axial direction between a first predetermined position and a second predetermined position, the first gear state being provided when the shifting fork is placed in the first predetermined position and the second gear state being provided when the shifting fork is placed in the second predetermined position, the first predetermined position and the second predetermined position being arranged one after the other without any further predetermined position providing a further selectable gear state arranged between the first predetermined position and the second predetermined position, wherein the first gear state provides a first gear of the transmission and the second gear state provides a second gear or a park lock state of the transmission, and the first gear and the second gear have different gear ratios providing different gears for the transmission, wherein the shifting fork is further displaceable in the axial direction so as to be placed in a further predetermined position providing a further gear state being a neutral of the transmission, and wherein, along the axial direction, positions of the shifting fork in sequential order being the further predetermined position, the first predetermined position, and the second predetermined position.

2. A transmission according to claim 1, wherein the transmission comprises a first shaft, a rotating member arranged on the first shaft, the rotating member being rotationally journaled relative to the first shaft, and a hub arranged on the first shaft, the hub being rotationally locked to the first shaft, and a sleeve moveable by means of the shifting fork in the axial direction, the sleeve and the hub being engageable and rotationally locked to each other when engaged, and the sleeve and the rotating member being engageable and rotationally locked to each other when engaged.

3. A transmission according to claim 2, wherein the rotating member is a gear wheel.

4. A transmission according to claim 2, wherein in the first predetermined position of the shifting fork, the sleeve and the rotating member are engaged and the sleeve and the hub are engaged.

5. A transmission according to claim 2, wherein in the further predetermined position of the shifting fork, the sleeve and the rotating member are engaged and the sleeve and the hub are disengaged.

6. A transmission according to claim 2, wherein the sleeve has splines arranged on an external surface of the sleeve for engagement with splines of the rotating member arranged on an internal surface of the rotating member, and the sleeve has splines arranged on an internal surface of the sleeve for engagement with splines of the hub arranged on an external surface of the hub.

7. A transmission according to claim 1, wherein the transmission further comprises a component which is activated by the shifting fork in the second predetermined position of the shifting fork.

8. A transmission according to claim 7, wherein the component is a further rotating member arranged on a shaft, the further rotating member being rotationally journaled relative to the shaft, and the further rotating member being rotationally locked to the shaft when activated by the shifting fork.

9. A transmission according to claim 8, wherein the further rotating member is a gear wheel.

10. A transmission according to claim 7, wherein the component is a park lock mechanism locking a shaft of the transmission against rotation when activated by the shifting fork.

11. A transmission according to claim 7, wherein the component is a park lock mechanism locking a shaft of the transmission against rotation when activated by the shifting fork and wherein the component is arranged on the first shaft of the transmission.

12. A transmission according to claim 7, wherein the component is a park lock mechanism locking a shaft of the transmission against rotation when activated by the shifting fork and wherein the component is arranged on a second shaft of the transmission.

13. A transmission according to claim 1, wherein the first predetermined position of the shifting fork is a first end position where the shifting fork is not movable further away from the second predetermined position, and the second predetermined position of the shifting fork is a second end position where the shifting fork is not movable further away from the first predetermined position.

14. A transmission according to claim 1, wherein the further predetermined position of the shifting fork is a first end position where the shifting fork is not movable further away from the second predetermined position, and the second predetermined position of the shifting fork is a second end position where the shifting fork is not movable further away from the further predetermined position.

\* \* \* \* \*